United States Patent
Kenkel et al.

(10) Patent No.: US 10,743,328 B2
(45) Date of Patent: Aug. 11, 2020

(54) CONCURRENT USAGE AND SCANNING OF WIRELESS CHANNELS

(71) Applicant: Shure Acquisition Holdings, Inc., Niles, IL (US)

(72) Inventors: Mark Allen Kenkel, Schaumburg, IL (US); Dean Komrska, Buffalo Grove, IL (US); Haneef Charania, Glenview, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 16/006,580

(22) Filed: Jun. 12, 2018

(65) Prior Publication Data

US 2018/0359763 A1 Dec. 13, 2018

Related U.S. Application Data (60) Provisional application No. 62/519,005, filed on Jun. 13, 2017.

(51) Int. Cl.
| | |
|---|---|
| *H04W 72/10* | (2009.01) |
| *H04W 72/08* | (2009.01) |
| *H04W 72/04* | (2009.01) |
| *G01S 7/02* | (2006.01) |
| *H04W 72/06* | (2009.01) |

(52) U.S. Cl.
CPC ....... *H04W 72/10* (2013.01); *H04W 72/0453* (2013.01); *H04W 72/082* (2013.01); *G01S 7/023* (2013.01); *H04W 72/06* (2013.01); *H04W 72/085* (2013.01)

(58) Field of Classification Search
CPC ............ H04W 72/10; H04W 72/0453; H04W 72/082; H04W 16/00; H04W 72/06; H04W 72/085; G01S 7/023
See application file for complete search history.

(56) References Cited

U.S. PATENT DOCUMENTS

| | | | |
|---|---|---|---|
| 6,697,013 | B2 | 2/2004 | McFarland |
| 6,834,045 | B1 | 12/2004 | Lappetelaeinen |
| 6,870,815 | B2 | 3/2005 | McFarland |
| 7,155,230 | B2 | 12/2006 | Tsien |
| 7,535,868 | B2 | 5/2009 | Black |
| 8,249,003 | B2 | 8/2012 | Hasegawa |
| 8,400,938 | B2 | 3/2013 | Matsuura |
| 8,432,826 | B2 | 4/2013 | Heidari |

(Continued)

FOREIGN PATENT DOCUMENTS

| | | |
|---|---|---|
| CN | 102577525 | 7/2012 |
| EP | 1257090 | 11/2002 |

(Continued)

OTHER PUBLICATIONS

International Search Report and Written Opinion for PCT/US2018/037133 dated Sep. 12, 2018.

(Continued)

*Primary Examiner* — Christopher P Grey
(74) *Attorney, Agent, or Firm* — Neal, Gerber & Eisenberg LLP (57) ABSTRACT

Systems and methods are described for concurrent usage and scanning of wireless channels, particularly with respect to dynamic frequency selection (DFS) and non-DFS channels.

16 Claims, 3 Drawing Sheets

(56) References Cited

U.S. PATENT DOCUMENTS

| | | |
|---|---|---|
| 8,805,420 B2 | 8/2014 | Kenney et al. |
| 8,873,523 B2 | 10/2014 | Bradley et al. |
| 8,937,928 B2 | 1/2015 | Ngo |
| 9,131,504 B2 | 9/2015 | Kenney et al. |
| 9,357,404 B2 | 5/2016 | Kamlani |
| 9,357,492 B2 | 5/2016 | Malik |
| 9,543,635 B2 | 1/2017 | Schulz |
| 9,565,684 B2 | 2/2017 | Barkay |
| 9,622,089 B1 | 4/2017 | Ngo et al. |
| 9,622,161 B1 | 4/2017 | Law |
| 9,635,649 B1 | 4/2017 | Amiri |
| 2005/0215266 A1 | 9/2005 | Tsien |
| 2010/0197317 A1 | 8/2010 | Sadek |
| 2011/0096739 A1* | 4/2011 | Heidari ............... H04W 72/085 370/329 |
| 2013/0314267 A1 | 11/2013 | Kenney et al. |
| 2014/0003237 A1 | 1/2014 | Kenney |
| 2014/0086081 A1 | 3/2014 | Mack |
| 2014/0301328 A1 | 10/2014 | Yacovitch |
| 2015/0163828 A1 | 6/2015 | Vandwalle |
| 2015/0256323 A1 | 9/2015 | Gandarillas Diego |
| 2016/0014824 A1 | 1/2016 | Xiang |
| 2016/0087897 A1 | 3/2016 | Hardt |
| 2016/0227416 A1 | 8/2016 | Suzuki |
| 2016/0345323 A1 | 11/2016 | Krishnamoorthy |
| 2017/0026988 A1 | 1/2017 | Guo |
| 2017/0034707 A1 | 2/2017 | Green |
| 2017/0034755 A1* | 2/2017 | Casebolt ............... H04W 36/36 |
| 2017/0055200 A1 | 2/2017 | Hassan |
| 2017/0094556 A1 | 3/2017 | Homchaudhuri |
| 2017/0118699 A1 | 4/2017 | Law |

FOREIGN PATENT DOCUMENTS

| | | |
|---|---|---|
| EP | 1257091 | 11/2002 |
| EP | 1374618 | 1/2004 |
| EP | 1393502 | 3/2004 |
| EP | 1405463 | 4/2004 |
| EP | 1562333 | 8/2005 |
| EP | 1645158 | 4/2006 |
| WO | 2002082844 | 10/2002 |
| WO | 2002093839 | 11/2002 |
| WO | 2003005643 | 1/2003 |
| WO | 2005009068 | 1/2005 |
| WO | 2016110046 | 7/2016 |
| WO | WO-2018098913 A1 * | 6/2018 ............. H04L 29/04 |

OTHER PUBLICATIONS

System Planning OpenStage WL 3/OpenStage WL3 Plus Planning Guide, Unify Software and Solutions GmbH & Co. KG, 34 pp., Dec. 2015.

Wireless Design Considerations for Industrial Applications, Cisco, Rockwell Automation, 97 pp., Jan. 2014.

\* cited by examiner

CONCURRENT USAGE AND SCANNING OF WIRELESS CHANNELS

CROSS-REFERENCE

This application claims the benefit of U.S. Provisional Patent Application No. 62/519,005, filed on Jun. 13, 2017, the contents of which are incorporated herein in their entirety.

TECHNICAL FIELD

This disclosure relates to the field of wireless communication, and more particularly, to scanning and using both dynamic frequency selection (DFS) and non-DFS channels designated within the 2.4 GHz and 5 GHz WiFi frequency bands.

BACKGROUND

Audio production can involve the use of many components, including microphones, wireless audio transmitters, wireless audio receivers, recorders, and/or mixers for capturing, recording, and presenting the sound of productions, such as television programs, newscasts, movies, live events, and other types of productions. The microphones typically capture the sound of the production, which is wirelessly transmitted from the microphones and/or the wireless audio transmitters to the wireless audio receivers. The wireless audio receivers can be connected to a recorder and/or a mixer for recording and/or mixing the sound by a crew member, such as a production sound mixer. Electronic devices, such as computers and smartphones, may be connected to the recorder and/or mixer to allow the crew member to monitor audio levels and timecodes.

Wireless audio transmitters, wireless audio receivers, wireless microphones, and other portable wireless communication devices include antennas for transmitting and receiving radio frequency (RF) signals which contain digital or analog signals, such as modulated audio signals, data signals, and/or control signals. Users of portable wireless communication devices include stage performers, singers, actors, news reporters, and the like.

A wireless audio transmitter may transmit an RF signal that includes an audio signal to a wireless audio receiver. The wireless audio transmitter may be included in a wireless handheld microphone, for example, that is held by the user and includes an integrated transmitter and antenna. When the RF signal is received at the wireless audio receiver, the RF signal may be degraded due to multipath fading caused by constructive interference and/or by other types of interference. This degradation may cause the RF signal to have a poor signal-to-noise ratio (SNR), which can result in bit errors that can cause audio artifacts and muting of the resulting output audio. However, muting the output audio is undesirable in many situations and environments, such as during professional stage productions and concerts. The effects of such multipath fading and interference are most prevalent in harsh RF environments where physical and electrical factors influence the transmission and reception of RF signals, e.g., movement of the microphone within the environment, other RF signals, operation in large venues, etc.

To alleviate issues with multipath fading of RF signals, and for various other reasons, wireless audio components may utilize frequency diversity and/or antenna diversity techniques. Accordingly, there is an opportunity for a wireless audio receiver system that addresses these concerns. More particularly, there is an opportunity for a wireless audio receiver system that makes use of both DFS and non-DFS channels.

SUMMARY

Systems and methods for concurrent usage and scanning of wireless channels are provided. According to a particular and non-limiting aspect, an example method may include scanning, with a first or second radio, a plurality of available non-DFS channels, and generating a non-DFS list ranking the plurality of non-DFS channels. The method may also include setting a current operating channel of a second radio to a best ranked non-DFS channel based on the non-DFS list. The method may then include, while the current operating channel of the second radio is set to the best ranked non-DFS channel, scanning, with the first radio, a plurality of DFS channels and generating a DFS list ranking the plurality of DFS channels. The method may further include automatically setting the current operating channel of the second radio to a best ranked DFS channel based on the DFS list. The example method may further include determining that there is a radar signal present on the best ranked DFS channel, and responsive to determining that there is a radar signal present on the best ranked DFS channel, (1) setting the current operating channel of the second radio to the best ranked non-DFS channel, (2) updating the DFS list to determine a new best ranked DFS channel that does not have a radar signal present, and (3) vetting the new best ranked DFS channel. The method may still further include automatically setting the current operating channel of the second radio to the new best ranked DFS channel.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION OF EXEMPLARY EMBODIMENTS

The description that follows describes, illustrates and exemplifies one or more particular embodiments of the invention(s) in accordance with its principles. This description is not provided to limit the invention(s) to the embodiments described herein, but rather to explain and teach the principles of the invention(s) in such a way to enable one of ordinary skill in the art to understand these principles and, with that understanding, be able to apply them to practice not only the embodiments described herein, but also other embodiments that may come to mind in accordance with these principles. The scope of the invention(s) is/are intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates the didactic purpose of the specification. Additionally, the drawings set forth herein are not necessarily drawn to scale, and in some instances proportions may have been exaggerated to more clearly depict certain features. Such labeling and drawing practices do not necessarily implicate an underlying substantive purpose. Furthermore, one or more drawings herein may be of a purely functional schematic nature, or a combination of a functional and structural/hardware schematic nature, intended to disclose and teach functional aspects of the subject matter without necessarily limiting the disclosure to any specific structure/hardware. As stated above, the present specification is intended to be taken as a whole and interpreted in accordance with the principles of the invention(s) as taught herein and understood to one of ordinary skill in the art.

With respect to the exemplary systems, components and architecture described and illustrated herein, it should also be understood that the invention(s) may be embodied by, or employed in, numerous configurations and components, including one or more system, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system. Furthermore, although one or more systems, devices, apparatuses, and other components may be described, all methods, systems, and articles of manufacture consistent with known architecture for these components are intended to be encompassed. For example, a processor may be implemented as part of one or more components as a microprocessor, microcontroller, application specific integrated circuit (ASIC), discrete logic, or a combination of other type of circuits or logic. Similarly, memories as part of one or more of these components may be DRAM, SRAM, Flash or any other type of memory. Flags, data, databases, tables, and other data structures may be separately stored and managed, may be incorporated into a single memory or database, may be distributed, or may be logically and physically organized in many different ways. Software programs, which may be described in terms of one or more code segments, may be parts of a single program, separate programs, or distributed across several memories and processors. The methods and functionality described herein may be implemented via hardware, software, and/or firmware, and processed by one or more processor-based systems, components or devices. Such methods and functionality may be described as a module or engine with the understanding that its implementation is not limited to any particular hardware, software, firmware, or device configuration, but rather encompassing all implementations/embodiments within the skill of one of ordinary skill in the art. Systems may be implemented in hardware, software, or a combination of hardware and software in one processing system or distributed across multiple processing systems. Accordingly, the invention(s) should not be construed as limited by the exemplary embodiments described herein or any of the associated didactic schematics.

Figure 1:
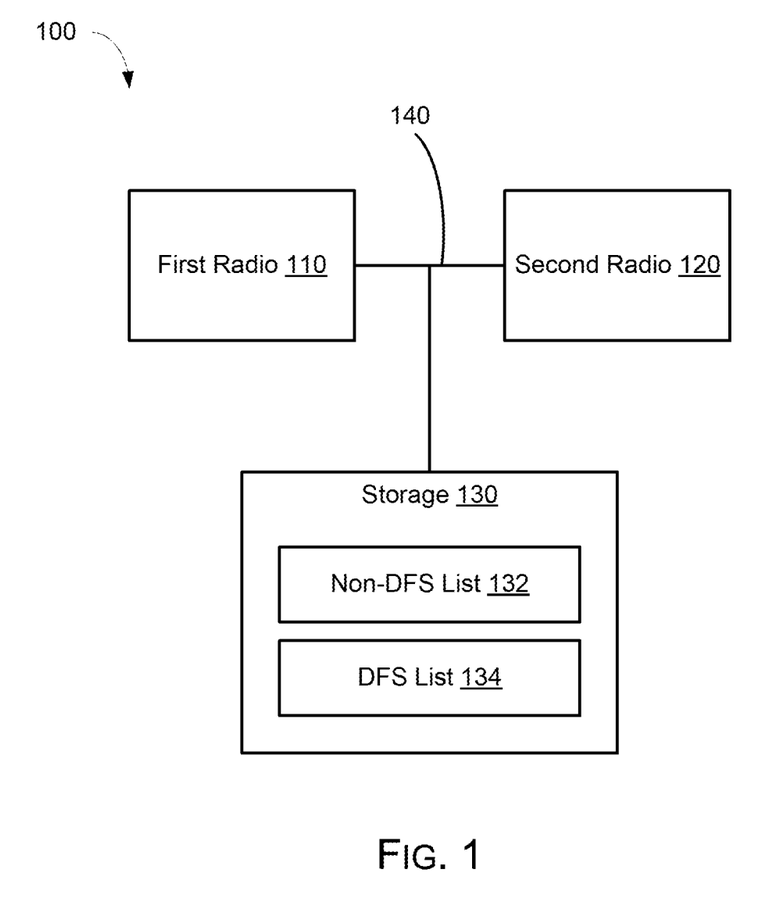
FIG. 1 is a schematic diagram of an example system according to embodiments of the present disclosure.

FIG. 1 illustrates a simplified block diagram of an example system 100 according to embodiments of the present disclosure. System 100 may include a first radio 110, a second radio 120, and a storage 130, all communicatively coupled via a communication path 140.

First radio 110 and second radio 120 may be configured to transmit and/or receive signals at various frequencies and with various characteristics. For instance, first radio 110 and second radio 120 may be configured to operate using channels in the 2.4 GHz and 5 GHz bands that are both dynamic frequency selection (DFS) and non-DFS channels. System 100 may prioritize operation using DFS channels, which may tend to be faster and less populated than non-DFS channels.

Dynamic frequency selection (DFS) may refer to the mechanism by which unlicensed devices are allowed to operate on a particular frequency band, such as the 5 GHz range of frequencies. This range may enable devices to transmit and receive information with a higher bandwidth, speed, and/or other characteristic as compared to other frequency bands. But frequencies in this band may be allocated to radar systems, such as for weather, air traffic, and military applications. As such, while these frequencies may be generally available for use by unlicensed devices, governmental or industry regulations may require devices operating on some of these frequencies to automatically switch off of the frequency/channel (i.e., to a non-DFS channel or un-used DFS channel) when a radar signal is detected.

As such, examples disclosed herein may refer to DFS channels and non-DFS channels, either of which may include channels that operate in the 2.4 GHz and 5 GHz bands for WiFi communication. It should be noted, however, that embodiments disclosed herein may be applied to other frequency ranges.

In some examples, system 100 may make use of both radios 110 and 120 to perform one or more aspects described herein. For instance, first radio 110 and/or second radio 120 may be configured to scan for available non-DFS and DFS channels. Further, radios 110 and/or 120 may be coupled to a processor (not shown) which may, among other things, determine a ranking or order of the non-DFS and DFS channels based on one or more criteria or characteristics, which may be stored in storage 130 as the non-DFS list 132 and DFS list 134 respectively.

In some examples, the non-DFS list 132 and DFS list 134 may include all accessible channels ranked according to one or more characteristics, such as (1) the channel quality, which may measure a current relative quality of the channel as determined by the percentage of packet retries, the current noise floor, and the duty cycle of non-WiFi devices on the channel, (2) the availability, which may measure the percentage of the channel currently available for use, (3) the utilization, which may measure the percentage of the channel being used, (4) the WiFi utility, which may measure the percentage of the channel being used by WiFi devices, and (5) the interference utility, which may measure the percentage of the channel being used by non WiFi interference and WiFi ACI (adjacent channel interference). Other characteristics may be considered as well. Further, the list(s) may include indications of whether a radar signal is present on each channel.

Each radio 110 and 120 may have one or more operating channels, such as a primary and a secondary (or tertiary, etc.) channel. And in some examples, scanning all accessible channels may include scanning all channels on which the radio or radios are able to operate.

Figure 2:
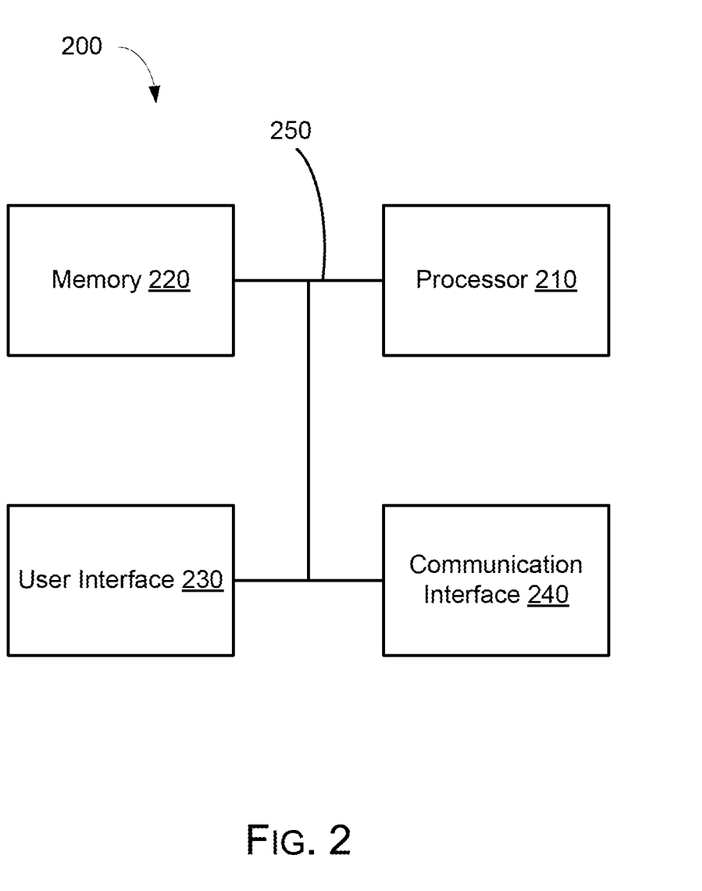
FIG. 2 illustrates a simplified block diagram of an example computing device capable of supporting and facilitating one or more aspects described herein.

FIG. 2 illustrates a simplified block diagram of an example computing device 200 according to embodiments of the present disclosure. Computing device 200 may be configured for performing a variety of functions or acts, such as those described in this disclosure (and accompanying drawings). The computing device 200 may include various components, including for example, a processor 210, memory 220, user interface 230, and communication interface 240, all communicatively coupled by system bus, network, or other connection mechanism 250. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein.

Processor 210 may include a general purpose processor (e.g., a microprocessor) and/or a special purpose processor (e.g., a digital signal processor (DSP)). Processor 210 may be any custom made or commercially available processor. Processor 210 may also represent multiple parallel or distributed processors working in unison.

Memory 220 may include one or more volatile (e.g., random access memory (RAM, such as DRAM, SRAM, SDRAM, etc.)) and nonvolatile (e.g., ROM, hard drive, flash drive, CDROM, etc.), removable, and/or non-removable storage components, such as magnetic, optical, or flash storage, and may be integrated in whole or in part with the processor 210. These and other components may reside on devices located elsewhere on a network or in a cloud arrangement. Further, the memory 220 may take the form of a non-transitory computer-readable storage medium, having stored thereon program instructions (e.g., compiled or non-compiled program logic and/or machine code) that, when executed by the processor 210, cause the device 200 to perform one or more functions or acts, such as those described in this disclosure. Such program instructions may define or be part of a discrete software application that can be executed in response to certain inputs received from the user interface 230 and/or communication interface 240, for instance. Memory 220 may also store other types of information or data, such as those types described throughout this disclosure.

User interface 230 may facilitate interaction with a user of the device, if applicable. As such, user interface 230 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 230 may also comprise devices that communicate with inputs or outputs, such as a short-range transceiver (RFID, Bluetooth, etc.), a telephonic interface, a cellular communication port, a router, or other types of network communication equipment. The user interface 230 may be internal to the computing device 200, or may be external and connected wirelessly or via connection cable, such as through a universal serial bus port.

Communication interface 240 may be configured to allow the device 200 to communicate with one or more devices (or systems) according to one or more protocols. In one example, the communication interface 240 may be a wired interface, such as an Ethernet interface or a high-definition serial-digital-interface (HD-SDI). As another example, the communication interface 240 may be a wireless interface, such as a cellular or WI-FI interface. In some examples, each of a plurality of computing devices 200 and/or other devices or systems on a network may be configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while some embodiments may include computing device 200 having a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

In the context of this document, a "computer-readable medium" may be any means that can store, communicate, propagate, or transport data objects for use by or in connection with the systems and methods as described herein. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The systems, devices, and methods can be embodied in any type of computer-readable medium for use by or in connection with an instruction execution system or apparatus, such as a computer.

Figure 3:
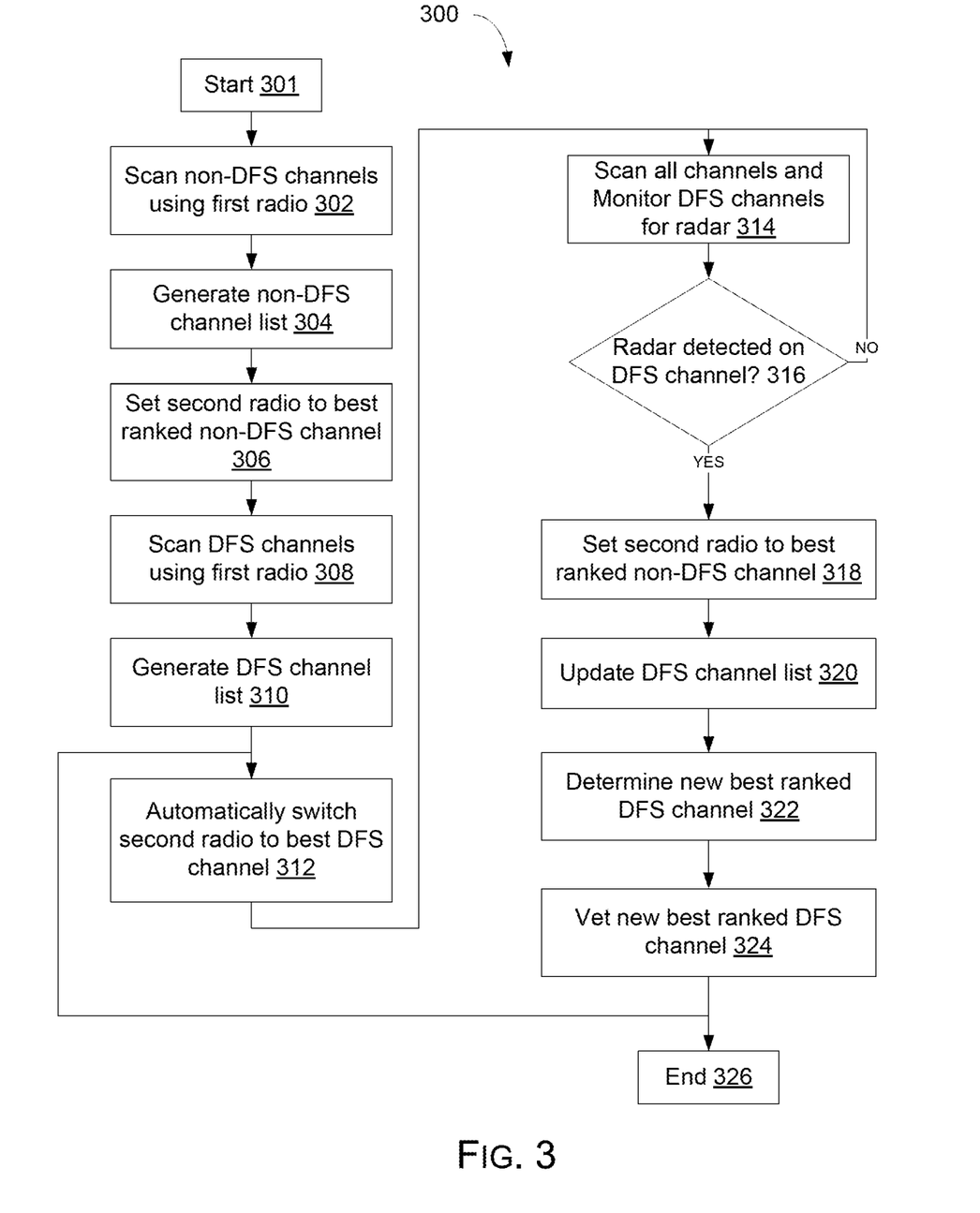
FIG. 3 is a flowchart illustrating an example method according to embodiments of the present disclosure.

FIG. 3 illustrates an example method 300 according to embodiments of the present disclosure. Method 300 may be performed by one or more computing devices or systems, such as system 100 and computing device 200 described with respect to FIGS. 1 and 2 respectively. The flowchart of FIG. 3 is representative of machine readable instructions that are stored in memory (such as memory 220 of computing device 200) and may include one or more programs which, when executed by a processor (such as processor 210 of computing device 200) may cause one or more systems or devices to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 301. At block 302, method 300 may include scanning non-DFS channels using a first radio. The non-DFS channels may include channels in both the 2.4 and 5 GHz ranges. It should be noted that some embodiments may include the use of two radios, and either radio may be used at this step in order to scan the non-DFS channels.

Block 304 of method 300 may include generating a non-DFS list ranking the plurality of non-DFS channels. The non-DFS list may rank the non-DFS channels in order of "best" to "worst," based on characteristics for each channel. For instance, the characteristics may include: (1) the channel quality, which may measure a current relative quality of the channel as determined by the percentage of packet retries, the current noise floor, and the duty cycle of non-WiFi devices on the channel, (2) the availability, which may measure the percentage of the channel currently available for use, (3) the utilization, which may measure the percentage of the channel being used, (4) the WiFi utility, which may measure the percentage of the channel being used by WiFi devices, and (5) the interference utility, which may measure the percentage of the channel being used by non WiFi interference and WiFi ACI (adjacent channel interference).

The non-DFS list may thus be used to organize or rank the various non-DFS channels, and to determine the best available non-DFS channel to use. At block 306, method 300 may include setting a current channel of a second radio to the best available non-DFS channel as determined based on the non-DFS list. It should be noted that in some examples, the second radio may be the radio used initially to scan the non-DFS channels for the initial ranking. As such, at this step the same radio that scanned the non-DFS channels initially may then have its current channel set to the best available non-DFS channel.

At block 308, method 300 may include using the first radio to perform a network scan for a plurality of DFS channels, which may include channels operating in the 5 GHz frequency band. In some examples, the DFS scanning may occur while the second radio is operating using the previously determined best non-DFS channel. As such, a device making use of both the first and second radios is able to communicate via the second radio, while the first radio is scanning to find a better channel.

Block 310 of method 300 may include generating a DFS channel list based on the scan. Similar to block 304, one or more of the plurality of DFS channels may include particular characteristics which may be used to rank the channels from "best" to "worst," including, for example, the channel quality, the availability, the utilization, the WiFi utility, and the interference utility, among others.

In some examples, generating the DFS list may include monitoring one or more DFS channels for a period of time. One or more DFS channels may include radar signals, based on their use for weather, air traffic, and/or military applications. As such, if a DFS channel is determined to be free from radar signals for a period of time, the DFS channel may be deemed available. However, if a radar signal is detected on a particular DFS channel, that channel may be marked as unavailable or occupied, and moved down the list or to the bottom of the list. In this manner, block 310 may include generating, updating, and/or modifying the DFS channel list when radar signals are detected and when a period of time has passed without detecting a radar signal on a given DFS channel. The period of time may be as short as one minute or less, up to 30 minutes or more.

After the DFS channel list has been generated and one or more DFS channels have been deemed available, block 312 of method 300 may include automatically switching the current channel of the second radio from the best ranked non-DFS channel to the best ranked DFS channel. In this manner, DFS channels have priority over non-DFS channels, such that when a DFS channel is deemed available the second radio automatically switches from a non-DFS channel to a DFS channel.

At block 314, method 300 may include monitoring one or more of the plurality of DFS channels for a radar signal. If no radar signal is detected on the current operating channel of the second radio (i.e., the best ranked DFS channel), block 316 may include returning back to block 314, at which the first radio continues to monitor DFS channels.

In some examples, blocks 314 and 316 of method 300 may include monitoring all non-DFS channels as well as available and unavailable DFS channels, and updating or modifying the DFS and non-DFS channel lists based on new information. The new information may include the detection of a radar signal, the passage of time without detection of a radar signal, and more. If a radar signal is detected on a DFS channel that is currently ranked below the best ranked DFS channel (e.g., the second, third, or other ranked DFS channel), that particular channel may be dropped down on the DFS channel list. And alternatively, if a DFS channel previously was unavailable due to the presence of a radar signal, but no radar signal has been detected for a period of time (e.g., 30 minutes), that DFS channel may be placed higher on the DFS channel list.

At block 316, if a radar signal is detected on the DFS channel currently set as the current operating channel of the second radio, block 318 may include switching the current 15 operating channel of the second radio to the best non-DFS channel. This transition may comply with governmental or industry regulations requiring the device to remove itself from operating on the DFS channel when a radar signal is detected.

When a radar signal is detected on the DFS channel, block 320 may also include updating the DFS channel list to indicate that the previous best ranked DFS channel (which now includes a radar signal) is no longer available for use by the second radio.

While the second radio current operating channel is set to the best non-DFS channel, the first radio may begin or continue to determine a new best ranked DFS channel at block 322. This may include moving down the DFS list from the now-unavailable DFS channel previously in use to the second in line, and modifying the list to account for the changes.

Block 324 may then include vetting the new best ranked DFS channel. This may include monitoring the new best ranked DFS channel for radar signals for a period of time, and determining that the channel is available for use.

Method 300 may then return to block 312, at which the second radio current operating channel is automatically switched to the (new) best ranked DFS channel. This may occur after the vetting has been done and it has been determined that the new best ranked DFS channel is available and free from radar signals.

Method 300 may then continue to proceed from block 312 through block 324 indefinitely, such that the second radio current operating channel is a best ranked DFS channel as often as possible. And when a radar signal is detected on the current operating channel, the method may include switching to an available non-DFS channel while a new DFS channel is vetted, such that the current operating channel can return to a DFS channel as soon as possible.

In some examples, the DFS channels may have one or more characteristics that are compared to one or more thresholds, to determine whether each DFS channel should be switched to or not. In the event all accessible DFS channels are beyond a usable threshold (as determined based on the DFS channel characteristics), some embodiments may include preventing the first and/or second radio from having their current operating channel(s) set to a DFS channel. As such, where there is at least one DFS channel available and having sufficient characteristics or operating metrics, the first and/or second radio may prioritize usage of the DFS channels after they have been vetted. However where no DFS channels are available or can pass the vetting process, the first and/or second radio may not switch to operating on a DFS channel, so as to avoid repeated jumping back and forth between DFS channels and non-DFS channels.

While one or more specific embodiments have been illustrated and described in connection with the invention(s), it is understood that the invention(s) should not be limited to any single embodiment, but rather construed in breadth and scope in accordance with recitation of the appended claims.

What is claimed is:

1. A method for wireless communication comprising:
   scanning a plurality of accessible non-DFS channels;
   determining a non-DFS list ranking the plurality of accessible non-DFS channels;
   setting a current operating channel of a first radio to a best ranked non-DFS channel based on the non-DFS list;
   while the current operating channel of the first radio is set to the best ranked non-DFS channel, scanning, with a second radio, a plurality of accessible DFS channels;
   determining a DFS list ranking the plurality of accessible DFS channels;
   responsive to determining that no radar signal is present on a best ranked DFS channel of the DFS list for a predetermined duration, setting the current operating channel of the first radio to the best ranked DFS channel of the DFS list;
   while the current operating channel of the first radio is set to the best ranked DFS channel scanned by the second radio;
      updating the non-DFS list and the DFS list using the second radio;
      vetting a second best ranked DFS channel using the second radio; and
   determining that there is a radar signal present on the current operating channel of the first radio;
   responsive to determining that there is a radar signal present on the current operating channel of the first radio (i) setting the current operating channel of the first radio to the best ranked non-DFS channel, and (ii) determining a new best ranked DFS channel, wherein the new best ranked DFS channel comprises the second best ranked DFS channel vetted using the second radio; and
   after determining the new best ranked DFS channel, setting the current operating channel of the first radio to the new best ranked DFS channel.

2. The method of claim 1, further comprising scanning, by the first radio, the plurality of accessible non-DFS channels.

3. The method of claim 1, further comprising scanning, by the second radio, the plurality of accessible non-DFS channels.

4. The method of claim 1, wherein determining the non-DFS list comprises ranking the plurality of non-DFS channels based on a detected amount of interference on each channel.

5. The method of claim 1, wherein determining the DFS list comprises ranking the plurality of DFS channels based on a detected amount of interference and the presence of a radar signal on each channel.

6. The method of claim 1, wherein determining the DFS list comprises, for each accessible DFS channel:
   receiving a signal for predetermined period of time; and
   analyzing the received signal to determine whether there is a radar signal present on the DFS channel.

7. The method of claim 1, wherein determining the new best ranked DFS channel comprises:
   removing the best ranked DFS channel from the top of the DFS list; and
   selecting, as the new best ranked DFS channel, a second DFS channel of the plurality of accessible DFS channels on the DFS list.

8. The method of claim 1, further comprising vetting the new best ranked DFS channel, wherein vetting the new best ranked DFS channel comprises:
   monitoring the new best ranked DFS channel for a predetermined duration; and
   determining that no radar signal is present on the new best ranked DFS channel during the predetermined duration.

9. A wireless communication device comprising:
   a first radio;
   a second radio; and
   a processor configured to:
      scan a plurality of accessible non-DFS channels;
      determine a non-DFS list ranking the plurality of accessible non-DFS channels;
      set a current operating channel of the first radio to a best ranked non-DFS channel based on the non-DFS list;
      while the current operating channel of the first radio is set to the best ranked non-DFS channel, scan, with the second radio, a plurality of accessible DFS channels;
      determine a DFS list ranking the plurality of accessible DFS channels;
      responsive to determining that no radar signal is present on a best ranked DFS channel of the DFS list for a predetermined duration, set the current operating channel of the first radio to the best ranked DFS channel of the DFS list;
      while the current operating channel of the first radio is set to the best ranked DFS channel scanned by the second radio;
         update the non-DFS list and the DFS list using the second radio;
         vet a second best ranked DFS channel using the second radio; and
         determine that there is a radar signal present on the current operating channel of the first radio;
      responsive to determining that there is a radar signal present on the current operating channel of the first radio, (i) set the current operating channel of the first radio to the best ranked non-DFS channel, and (ii) determine a new best ranked DFS channel, wherein the new best ranked DFS channel comprises the second best ranked DFS channel vetted using the second radio; and
      after determining the new best ranked DFS channel, set the current operating channel of the first radio to the new best ranked DFS channel.

10. The wireless communication device of claim 9, wherein the processor is further configured to scan, by the second radio, the plurality of accessible non-DFS channels.

11. The wireless communication device of claim 9, wherein the processor is further configured to determining the non-DFS list by ranking the plurality of non-DFS channels based on a detected amount of interference on each channel.

12. The wireless communication device of claim 9, wherein the processor is further configured to determine the DFS list by ranking the plurality of DFS channels based on a detected amount of interference and the presence of a radar signal on each channel.

13. The wireless communication device of claim 9, wherein the processor is further configured to determine the DFS list by, for each accessible DFS channel:
   receiving a signal for predetermined period of time; and
   analyzing the received signal to determine whether there is a radar signal present on the DFS channel.

14. The wireless communication device of claim 9, wherein the processor is further configured to determine the new best ranked DFS channel by:
   removing the best ranked DFS channel from the top of the DFS list; and
   selecting, as the new best ranked DFS channel, a second DFS channel of the plurality of accessible DFS channels on the DFS list.

15. The wireless communication device of claim 9, wherein the processor is further configured to vet the new best ranked DFS channel, wherein vetting the new best ranked DFS channel comprises:
   monitoring the new best ranked DFS channel for a predetermined duration; and
   determining that no radar signal is present on the new best ranked DFS channel during the predetermined duration.

16. A non-transitory, computer readable medium having instructions stored thereon that, when executed by a processor, cause the performance of a set of actions comprising:
   scanning a plurality of accessible non-DFS channels;
   determining a non-DFS list ranking the plurality of accessible non-DFS channels;
   setting a current operating channel of a first radio to a best ranked non-DFS channel based on the non-DFS list;
   while the current operating channel of the first radio is set to the best ranked non-DFS channel, scanning, with a second radio, a plurality of accessible DFS channels;
   determining a DFS list ranking the plurality of accessible DFS channels;
   responsive to determining that no radar signal is present on a best ranked DFS channel of the DFS list for a predetermined duration, setting the current operating channel of the first radio to the best ranked DFS channel of the DFS list;
   while the current operating channel of the first radio is set to the best ranked DFS channel scanned by the second radio;
      updating the non-DFS list and the DFS list using the second radio;
      vetting a second best ranked DFS channel using the second radio; and
      determining that there is a radar signal present on the current operating channel of the first radio;
   responsive to determining that there is a radar signal present on the current operating channel of the first radio, (i) setting the current operating channel of the first radio to the best ranked non-DFS channel, and (ii) determining a new best ranked DFS channel, wherein the new best ranked DFS channel comprises the second best ranked DFS channel vetted using the second radio; and
   after determining the new best ranked DFS channel, setting the current operating channel of the first radio to the new best ranked DFS channel.

\* \* \* \* \*

UNITED STATES PATENT AND TRADEMARK OFFICE
CERTIFICATE OF CORRECTION

PATENT NO. : 10,743,328 B2  
APPLICATION NO. : 16/006580  
DATED : August 11, 2020  
INVENTOR(S) : Mark Allen Kenkel et al.

Page 1 of 1

It is certified that error appears in the above-identified patent and that said Letters Patent is hereby corrected as shown below:

In the Claims

Claim 1, Column 9, Line 44, "venting a second" should read --vetting a second--.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*